United States Patent [19]

Mayfield, Jr. et al.

[11] Patent Number: 4,508,132
[45] Date of Patent: Apr. 2, 1985

[54] TEMPERATURE CONTROLLED VALVE MECHANISM AND METHOD

[75] Inventors: John M. Mayfield, Jr., Ukiah; Vernon Haselswerdt, Willits, both of Calif.

[73] Assignee: Microphor, Inc., Willits, Calif.

[21] Appl. No.: 393,104

[22] Filed: Jun. 28, 1982

Related U.S. Application Data

[62] Division of Ser. No. 73,941, Sep. 10, 1979, Pat. No. 4,356,833.

[51] Int. Cl.³ ............... G05D 23/275; F16K 31/122
[52] U.S. Cl. ...................... 137/62; 137/468; 137/563; 236/86; 237/80; 251/63.4; 251/63.6; 251/77
[58] Field of Search ............ 137/59, 60, 61, 62, 137/79, 468, 488, 490, 563, 565; 236/86; 237/80; 251/25, 28, 38, 62, 63.5, 63.6, 77, 63.4

[56] References Cited

U.S. PATENT DOCUMENTS

| | | | |
|---|---|---|---|
| 629,794 | 8/1899 | Lindsay | 137/61 |
| 1,883,690 | 10/1932 | Gilgenberg | 251/118 |
| 2,291,783 | 8/1942 | Baak | 137/79 |
| 2,371,428 | 3/1945 | de Giers et al. | 236/86 |
| 2,401,144 | 5/1946 | Dube | 137/468 |
| 2,520,216 | 8/1950 | Kounovsky | 251/28 |
| 2,566,173 | 8/1951 | Dillman | 251/28 |
| 2,631,781 | 3/1953 | Dillman | 137/468 |
| 2,798,689 | 7/1957 | Houghton | 251/28 |
| 2,829,837 | 4/1958 | Willcox | 236/86 |
| 3,239,189 | 3/1966 | Ray | 137/11 |
| 3,263,693 | 8/1966 | Ages | 236/80 R |
| 3,338,518 | 8/1967 | Barbier | 236/86 |
| 3,452,929 | 7/1969 | Douglas | 236/80 R |
| 3,593,959 | 7/1971 | Greene | 251/63.6 |
| 3,791,578 | 2/1974 | Brand et al. | 251/38 |
| 3,857,446 | 12/1974 | Kenny | 137/468 |
| 3,929,313 | 12/1975 | Noah | 251/28 |
| 4,016,901 | 4/1977 | Kenny | 236/56 |
| 4,026,465 | 5/1977 | Kenny | 236/48 R |
| 4,232,696 | 11/1980 | Burris et al. | 137/62 |
| 4,356,833 | 11/1982 | Mayfield, Jr. et al. | 137/62 |
| 4,361,167 | 11/1982 | Harasewych | 137/62 |

FOREIGN PATENT DOCUMENTS 566005 4/1958 Belgium ............... 236/86

Primary Examiner—George L. Walton
Attorney, Agent, or Firm—Christie, Parker & Hale

[57] ABSTRACT

The temperature controlled valve mechanism herein comprises a valve housing, a valve inlet in the housing for connection with a fluid source, a valve outlet in the housing for draining fluid from the housing and a valve closure member supported for movement toward and away from the valve outlet between closed and opened positions. The valve closure member blocks and closes the valve outlet when it is in the closed position. A biasing spring is provided for urging the valve closure member away from the closed position. An expansion chamber is formed within the housing. Apparatus for introducing a pressure into the expansion chamber is provided for moving the closure member to a closed position against the force of the biasing spring upon entry of a pressurized medium into the expansion chamber. A temperature-activated venting mechanism for venting and depressurizing the expansion chamber upon occurrence of a predetermined temperature drop is provided. Such temperature-activated venting system vents the pressurized medium from the expansion chamber causing the biasing spring to rapidly move the valve closure member from the closed position, whereupon the valve mechanism is opened. When the valve mechanism is thusly opened, the fluid within the system is drained from the system.

18 Claims, 8 Drawing Figures

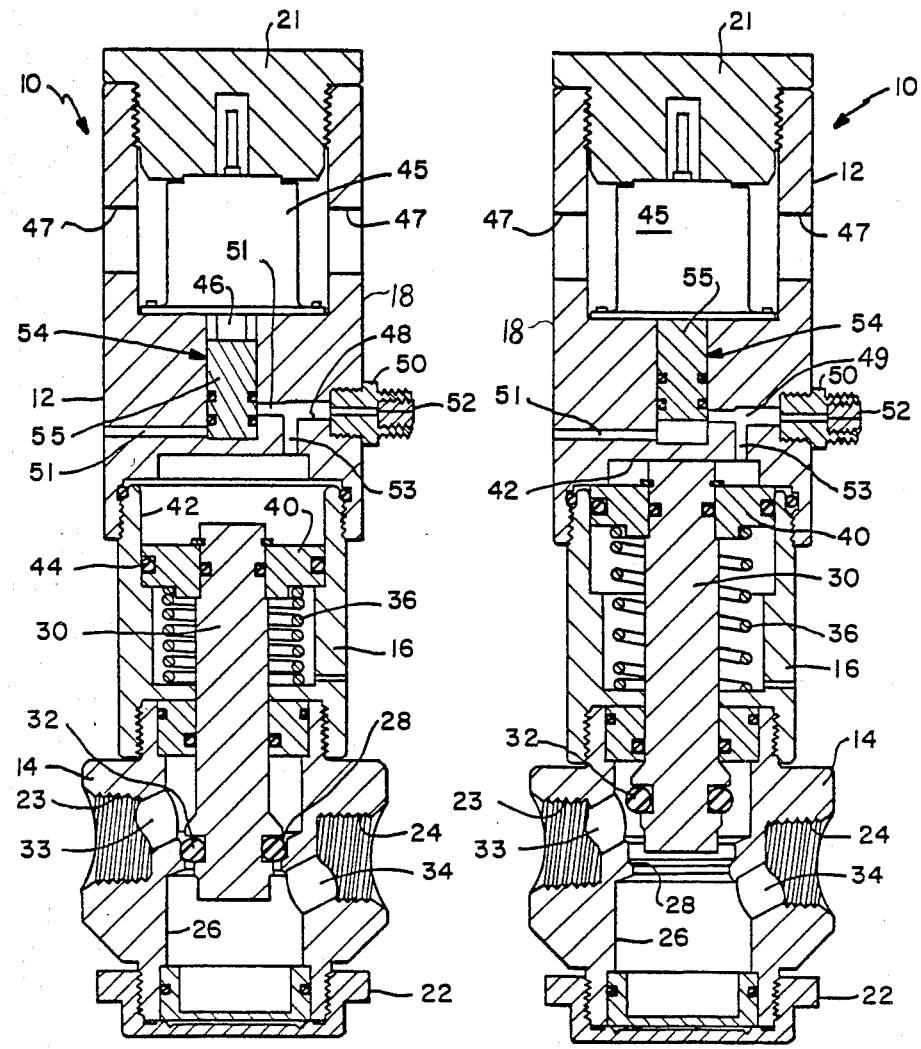
FIG.—1  FIG.—2
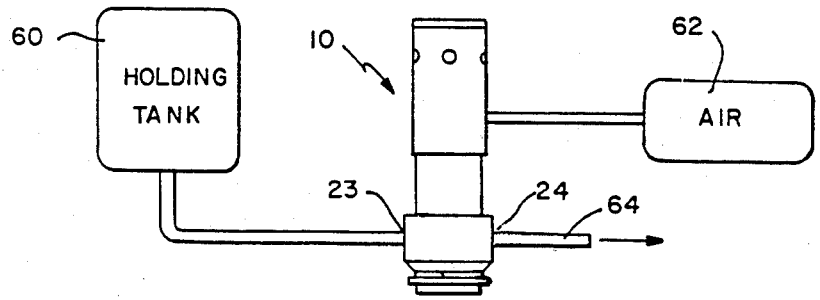
FIG.—3

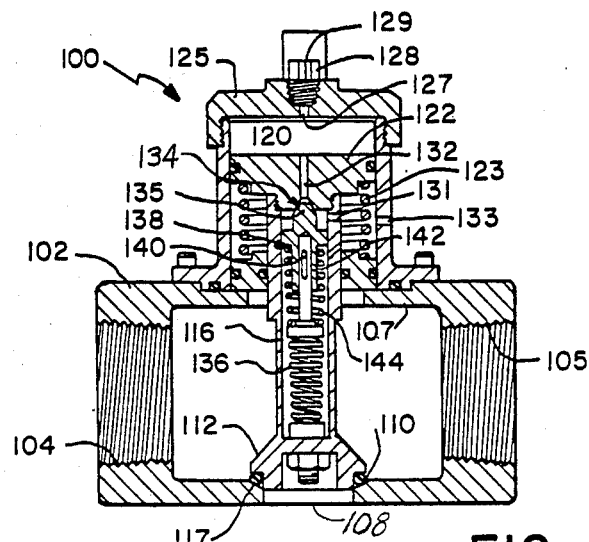
FIG.—4
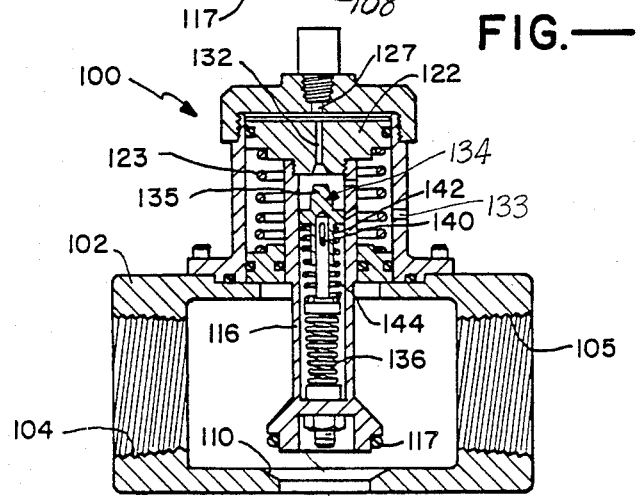
FIG.—5
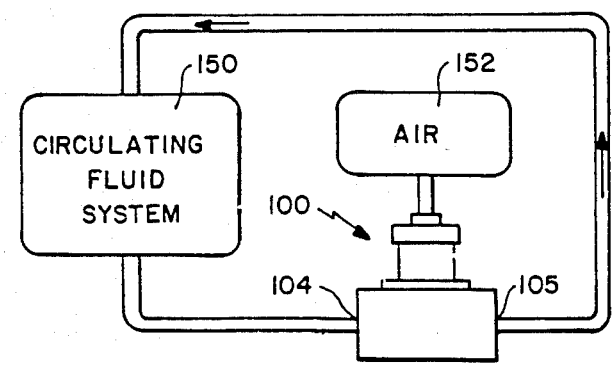
FIG.—6

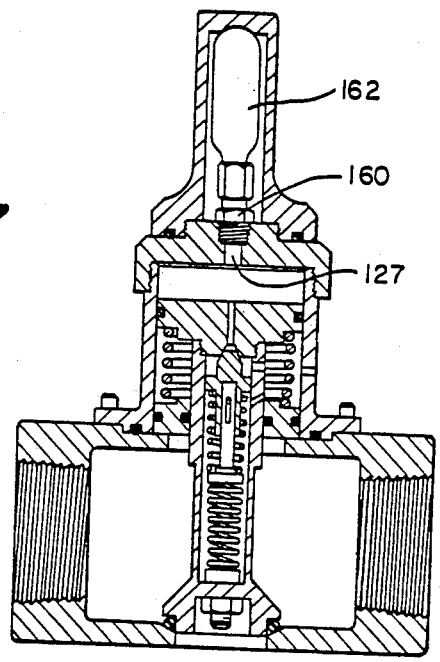
FIG.—7
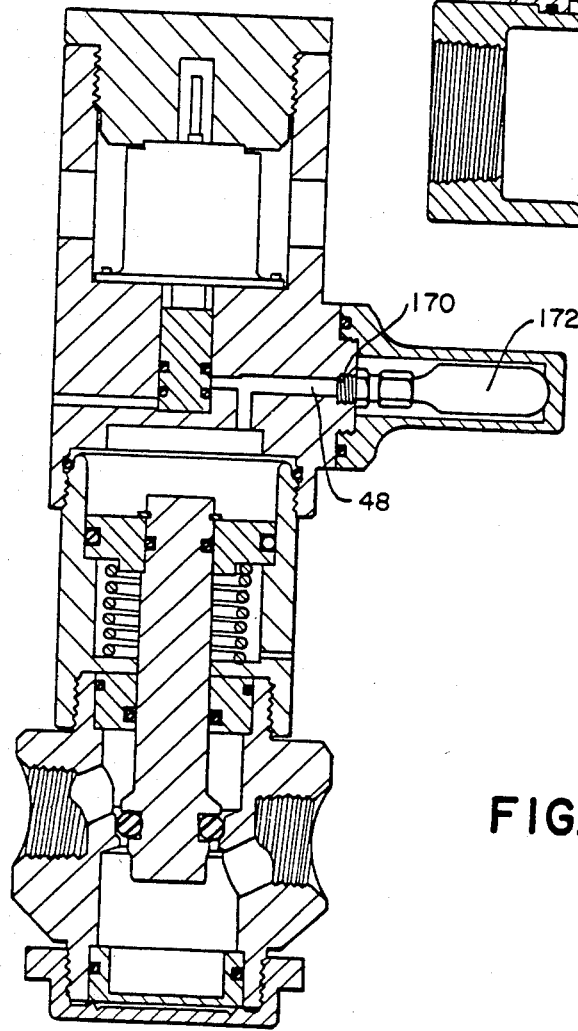
FIG.—8

TEMPERATURE CONTROLLED VALVE MECHANISM AND METHOD

This is a division of application Ser. No. 73,941, filed Sept. 10, 1979 now U.S. Pat. No. 4,356,833, issued Nov. 2, 1983.

The present invention relates generally to temperature controlled valve mechanisms and more particularly to protective valves of the type which rapidly open upon occurrence of a predetermined temperature.

Temperature controlled valves are useful in many applications where a fluid system must be protected against temperature extremes without the use of fluid additives. For example, water contained in holding tanks on vehicles for drinking or washing must be protected from freezing but generally cannot be treated with antifreeze. To protect against severe damage from freezing, such tank holding systems must include means for dumping the water as the temperature approaches the freezing point. Similar protection is required for water cooling systems used in large engines such as locomotives, which operate more or less continuously and are not protected by antifreeze. Fluid systems which experience substantial water loss through evaporation, such as certain solar heating systems, can also be protected against freezing by means of temperature controlled valves.

Numerous types of valves are available which are temperature responsive. One valve presently used in the railroad industry for dumping cooling system water and holding tanks incorporates a conventional temperature-sensitive bellows actuator to open and close the valve. The bellows actuator is a device which extends and retracts an actuating member in response to temperature changes. The valve stem is coupled to the actuating member, and the valve is opened and closed at predetermined temperatures. A significant problem with prior art valves of this type, when used to protect against freezing, is the relatively slow action of the bellows actuator. The bellows actuator will initially retract slightly as the temperature begins to approach freezing, unseating the valve in a process called valve crawl. When the valve is unseated, water begins to slowly leak from the valves. In periods of rapidly falling temperatures, water leaking around the unseated valve stem will freeze and block the valve before it has a chance to open. The frozen valve will thus fail to drain the fluid system, causing potentially enormous damage.

The problems inherent in temperature controlled valves which directly couple a bellows actuator to the valve stem necessitate undesirable protective steps. For example, it may be necessary to use a bellows actuator set a few degrees higher than would otherwise be necessary in order to assure full opening under anticipated weather conditions. The disadvantage with that approach is that the system may be drained unnecessarily. Temperature controlled valves have also been developed which incorporate an indirect mechanical connection between the bellows actuator and the valve stem. In U.S. Pat. No. 4,026,465, for example, a bellows or bimetallic actuator is employed to operate a spring-loaded snap action valve in which the valve stem assumes one of two rest positions. The actuator in U.S. Pat. No. 4,026,465 acts on a mechanical lever which is immersed in the fluid to be drained. The disadvantage of an indirect mechanical connection is that the actuator must reliably operate a relatively complex linkage which retains the potential for freezing and becoming inoperative under rapidly falling temperature conditions.

It is an object of the present invention to provide a temperature controlled valve mechanism which operates to drain a fluid system in response to temperature changes by providing full and rapid opening of the valve mechanism upon occurrence of a predetermined temperature.

Another object of the invention is to provide a temperature controlled valve mechanism for draining fluid systems in which the temperature responsive actuator is not subject to locking under conditions which produce freezing of the fluid system.

Another object of the invention is to provide a method of draining a fluid system in response to temperature changes which is rapid and reliable and eliminates all possibility of premature unseating of the valve mechanism employed.

Accordingly, the present invention provides a temperature controlled valve mechanism. The mechanism includes a valve housing having a valve inlet for connection with a fluid source. A valve outlet in the housing is used for draining fluid from the housing. A valve closure member is supported for movement toward and away from the valve outlet between closed and open positions, the valve closure member blocking and closing the valve outlet when in the closed position. Biasing means urge the valve closure member away from the closed position. Means defining an expansion chamber are provided in the housing, including means for moving the valve closure member to the closed position against the force of the biasing means upon entry of a pressurized medium into the expansion chamber. The valve mechanism further includes temperature activated venting means for venting and depressurizing the expansion chamber upon occurrence of a predetermined temperature. The venting of the expansion chamber causes the biasing means to rapidly move the valve closure member from the closed position, causing the valve mechanism to be opened.

The method of the present invention for draining a fluid system in response to temperature changes using the valve mechanism described above includes the following steps: A pressurized medium other than the fluid in the fluid system is received within the expansion chamber associated with the valve mechanism. The pressurized medium causes expansion of the expansion chamber to produce a closing force which counteracts the force of the biasing means to close the valve mechanism. The expansion chamber is then vented and depressurized upon occurrence of a predetermined temperature, causing rapid opening of the valve mechanism by the biasing means.

A preferred embodiment of the invention is described in detail below with reference being made to the accompanying drawings, in which:

FIGS. 1 and 2 are cross sectional views of the first embodiment of a temperature controlled valve mechanism in accordance with the present invention.

FIG. 3 is a schematic diagram of a fluid system incorporating the valve mechanism of FIGS. 1 and 2.

FIGS. 4 and 5 are cross sectional views of another embodiment of a temperature controlled valve mechanism in accordance with the present invention.

FIG. 6 is a schematic diagram of a fluid system incorporating the valve mechanism of FIGS. 4 and 5.

FIGS. 7 and 8 are cross sectional views of two additional alternative embodiments of temperature controlled valve mechanisms in accordance with the present invention.

Referring to FIGS. 1 and 2, a temperature controlled valve mechanism 10 is shown in the form of a drain or dump valve for fluid systems. Valve 10 includes a housing 12 formed of metal or any suitable synthetic material, for example Selcon (trademark), manufactured by Celanese Corporation. In the first embodiment shown in FIGS. 1 and 2, housing 12 consists of several portions fitted together, including a lower valve portion 14, and central and upper portions 16 and 18, respectively, together with threaded caps 21 and 22.

The valve portion 14 includes a valve inlet 23 and valve outlet 24, which communicate with a central valve chamber 26. A valve seat 28 is provided between the inlet and outlet. A valve stem 30 extends into valve chamber 26 and includes a suitable resilient ring 32 for engaging seat 28. Valve inlet 23 is adapted for connection to a fluid source, and valve outlet 24 drains fluid from the housing. The valve inlet includes an outer threaded portion together with a communicating passage 33 and the upper portion of valve chamber 26 above seat 28, as viewed in FIGS. 1 and 2. The valve outlet includes an outer threaded portion together with a communicating passage 34 and the lower portion of valve chamber 26 below seat 28.

Valve stem 30 and cooperating ring 32 together form a valve closure member which is movable toward and away from valve seat 28. FIG. 1 shows stem 30 in the closed position, with ring 32 engaging seat 28 and blocking and closing the valve outlet. FIG. 2 shows stem 30 in the open position in which ring 32 is pulled away from seat 28, allowing fluid to flow freely between valve inlet 23 and outlet 24. A spring 36 is provided in the housing to urge valve stem 30 away from the closed position of FIG. 1, toward the open position of FIG. 2. Spring 36 is a coil spring in the preferred embodiment, although another suitable biasing means could be employed.

Attached to the upper portion of valve stem 30 is a piston head 40 which extends to the walls of an expansion chamber 42 formed in housing 12. Piston head 40 forms a movable wall of expansion chamber 42, and includes an O-ring 44 to provide a suitable seal. Expansion chamber 42 has a maximum volume when valve stem 30 is in the closed position (FIG. 1), and a minimum volume when valve stem 30 is in the open position (FIG. 2).

In the upper part of the valve housing, as viewed in FIGS. 1 and 2, is a bellows-type temperature responsive actuator 45 which is part of a temperature activated venting means for venting and depressurizing expansion chamber 42. Bellows actuators 45 of this type are well known in the art of temperature responsive devices. The bellows actuator includes an actuator piston 46 which extends from the actuator when the ambient temperature is within a predetermined range (see FIG. 1). At a predetermined temperature, termed the actuation temperature herein, the actuator piston is retracted (see FIG. 2). Openings 47 are provided in the side of housing 12 to admit air into the vicinity of bellows actuator 45. The actuator thus monitors and responds to changes in the ambient air temperature around the valve mechanism. Bellows actuators are available with a variety of temperature sensitivities and can be selected to retract at any desired temperature. One manufacturer of such actuators is Robert Shaw, Inc.

To drive stem 30 downwardly into its closed position against the force of spring 36, a pressurized medium is introduced into expansion chamber 42. An inlet passageway 48 in housing 12 communicating with expansion chamber 42 is used to admit a pressurized medium such as compressed air into the expansion chamber. A fitting 50 is provided at the opening of inlet passageway 48 as a means for connecting a source of pressurized medium to the inlet passageway. A reduced-diameter orifice insert and check valve 52 are installed in fitting 50. An external pneumatic system is connected to fitting 50 to provide the pressurized medium for filling expansion chamber 42. If air at a pressure of 30 to 100 psi is supplied to fitting 50, check valve 52 will have an orifice diameter of 1/32 of an inch. The check valve will permit pressurized medium to enter the expansion chamber by way of inlet passageway 48 and prevent escape of the pressurized medium from the expansion chamber by way of inlet passageway 48.

To release the pressure in expansion chamber 42, a vent passageway 51 is provided in housing 12 between the expansion chamber and the exterior of the housing. The vent passageway is at one end of a common passageway through the housing, with inlet passageway 48 at the other end. The inlet and outlet passageways join one another at a junction point 49, where a communicating passageway 53 from chamber 42 extends. Both ingress and egress of pressurized medium to expansion chamber occurs through communicating passageway 53. To control the venting and the pressurizing of expansion chamber 42, an auxiliary pneumatic valve 54 is provided in vent passageway 51. Auxiliary valve 54 is operated by bellows actuator 45. A valve closure element in the form of valve gate 55 is coupled to actuator piston 46. When the actuator piston is extended, as in FIG. 1, and valve gate 55 is in its closed position, the vent passageway is blocked, and when the actuator piston is withdrawn and the valve gate 55 is in its open position, as in FIG. 2, the vent passageway is open. Preferably, the valve gate is slightly longer than would be minimally required to block the vent passageway, so that it must be moved a significant fraction of its length before the vent passageway is opened. This permits some substantial movement of the valve gate before the valve opens to allow for initial movements of the actuator piston 46 as the bellows begin to contract.

In use, the first embodiment valve 10 is installed in a fluid system in the manner illustrated in FIG. 3. If used as a protective device for water holding tanks or the like, the holding tank 60 is connected to valve inlet 23. Holding tank 60 can be any type of water system requiring protection against freezing, such as a plumbing system for railway rolling stock, cabooses, road vehicles or the like. A pneumatic system 62 or other source of compressed air is connected to the inlet passageway fitting 50. Pneumatic systems which provide air pressure in the range of 30-100 psi are readily available on railway equipment, where they are used to operate brakes and other essential control equipment. Some road vehicles are also equipped with pneumatic systems. To complete the valve connections, drain pipe 64 is fitted to valve outlet 24, if desired, to direct the fluid as it drains from the system. Although the valve is illustrated in a vertical orientation, it will be appreciated that the valve will operate equally well if mounted non-vertically. Of course, in drain or dump valves of this type, it is important that the valve be located at the lowest point in the fluid system to provide effective draining of all tanks and connecting lines.

Operation of the first embodiment valve illustrated in FIGS. 1–3 will be described in conjunction with a description of the steps in the method of the present invention. The valve is first installed in the manner shown in FIG. 3, after which pressurized medium such as air from pneumatic system 62 is received within expansion chamber 42 of the valve mechanism. The pressurized medium causes expansion of expansion chamber 42; the expansion taking place as piston 40 at the upper end of valve stem 30 is driven downwardly. The force exerted by the pressurized medium in expansion chamber 42 overcomes the closing force of spring 36 and causes the stem to engage seat 28 and close the valve. At that point, the valve is in the mode illustrated in FIG. 1, which will be the normal operating mode of the valve during non-critical ambient temperatures.

Assuming valve 10 is provided with a bellows actuator 45 which retracts at approximately 34 degrees Fahrenheit, the valve will remain substantially as shown in FIG. 1 until the ambient temperature approaches 34 degrees. As the surrounding air temperature descends from a higher temperature and approaches the 34 degree actuation temperature, piston 46 of actuator 45 will begin to retract, drawing with it valve gate 55. In the preferred embodiment, valve gate 55 will retract sufficiently to vent the pressurized medium in expansion chamber 42 only when actuator piston 46 is substantially fully retracted. When that occurs, as illustrated in FIG. 2, expansion chamber 42 is rapidly depressurized as air escapes through vent passageway 51. Immediately upon depressurization of expansion chamber 42, spring 36 drives stem 30 upwardly, fully opening the valve and allowing the water to drain from the fluid system.

If the temperature remains below 34 degrees, valve gate 55 remains retracted and no repressurization of expansion chamber 42 can take place. Assuming a railway pneumatic system is connected to inlet passageway 48, air will continuously pass through orifice check valve 52 and out through vent passageway 51. The small size of the orifice and check valve 52 controls the amount of air which escapes. Railway or other industrial pneumatic systems are unaffected by the small amount of leakage which will occur in this manner.

A final step of the valve operation occurs if the temperature again rises above the actuation temperature of bellows 45. Piston 46 will extend from the bellows, driving valve gate 55 into its closed position. With vent passageway 51 blocked, air entering inlet passageway 48 repressurizes expansion chamber 42, driving valve stem 30 downwardly into its closed position.

Assuming all seals surrounding expansion chamber 42 are tight, the interruption of the air supply from the external pneumatic system when the valve is closed will have no effect. The air or other pressurized medium in expansion chamber 42 will continue to hold valve stem 30 in a closed position until the temperature drops to the actuating temperature of the bellows. If the temperature does drop and the valve opens, the interrupted air supply will prevent the valve from reclosing. This presents no problem in most railway and industrial applications where the pneumatic system will be shut down only when the remainder of the equipment is not being used.

The present invention has numerous advantages over valves which use direct or indirect mechanical connections between the bellows actuator and valve stem. Most significantly, the valve of the present invention will always open rapidly and fully upon occurrence of the critical actuating temperature of the bellows actuator. The problems of valve "crawl" where slight movement of the actuator piston is translated into an unseating of the valve stem, cannot occur with the present invention. Moreover, the bellows actuator is required to move only a single lightweight element rather than a complex linkage arrangement. Consequently, the mechanism will be more responsive to temperature changes, and less likely to jam or freeze than prior art valves. The present invention eliminates the possibility of failure due to freezing of the fluid in the protected system because a different fluid medium is employed to actuate the valve. As such, the valve will not freeze even under rapidly falling temperature conditions. The present invention thus eliminates the major problems associated with prior art temperature responsive valves, and does so without increased cost or complexity.

An alternative embodiment of the present invention is shown in FIGS. 4–6. In this embodiment, the temperature controlled valve mechanism 100 includes a valve housing 102 preferably formed of metal which will withstand relatively high temperatures, such as brass. A plurality of valve inlets 104 and 105 are disposed at opposite ends of the lower portion of the housing. The valve inlets are threaded and are suitable for connection with a fluid source such as a circulating fluid cooling system (see FIG. 6). Valve inlets 104 and 105 are disposed at opposite ends of a flow through conduit 107 in the housing, through which fluid in the external circulating system will flow. Housing 102 is additionally provided with a valve outlet 108 for draining flow through conduit 107 and the associated fluid system. Valve outlet 108 is provided with a seat 110. Although both valve parts 104 and 105 are designated as valve inlets, it will be appreciated that during the normal operation of the circulating cooling system, liquid will enter flow through conduit 107 through one of the valve inlets and exit through the other. It is only after the valve mechanism has opened to drain the fluid system through valve outlet 108 that fluid will flow into the housing through both valve inlets 104 and 105.

A valve closure member 112 is provided to engage seat 110 and block and close valve opening 108. The valve closure member includes a stem 116 and a suitable resilient ring 117 which engages seat 110. Stem 116 is supported to allow movement of the valve closure member toward and away from valve outlet 108 between closed and open positions. The valve closure member blocks and closes the valve outlet when in the closed position shown in FIG. 4. The open position of the valve is illustrated in FIG. 5.

An expansion chamber 120 is formed in the upper end of housing 102, and includes a movable wall 122 coupled to stem 116. Wall 122 serves as an expansion piston and is movable with the valve closure member. As in the first embodiment, the volume of expansion chamber 120 changes in response to the ingress and egress of pressurized medium to the expansion chamber. A spring 123 serves as a biasing element for urging the stem and the valve closure member away from the closed position of FIG. 4 and toward the open position of FIG. 5.

In this embodiment, the inlet passageway for admitting pressurized medium from an external source of pressurized medium is located in the center of the threaded cap 125 on the top of the housing. Inlet passageway 127 is provided with a fitting 128 which permits connection of a source of pressurized medium. When an external pneumatic system is used for the pressurized medium, it is preferable to employ a small-diameter orifice insert 129. Insert 129 is also a check valve which serves to admit pressurized medium into the expansion chamber 120 by way of inlet passageway 127 and prevents escape of pressurized medium from the expansion chamber by way of the inlet passageway.

Stem 116 has an open interior, and the temperature activated venting means for venting and depressurizing expansion chamber 120 is installed in the open interior of stem 116. The means for venting includes a vent passageway 132 through wall 122 between expansion chamber 120 and the open interior of stem 116. Openings 131 and 133 allow pressurized medium which exits expansion chamber 120 through vent passageway 132 to escape the open interior of stem 116 and housing 102. An auxiliary valve 134 in the stem includes a closure element 135 which is movable to block and close vent passageway 132. A temperature responsive actuator 136 in the form of a conventional bellows-type actuator is disposed within the lower portion of stem 116. In that position, the bellows actuator is within flow conduit 107 and monitors changes in the temperature of the fluid in the valve. The bellows actuator 136 used in this embodiment is of a type which expands and contracts its length in response to temperature changes. Suitable actuators of this type are readily available in various temperature ranges having various expansion characteristics and are available from, among others, Robert Shaw, Inc.

Bellows actuator 136 is coupled to auxiliary valve closure element 135 by means of a lost motion linkage 138. A conventional slot and pin arrangement is used for the lost motion linkage. Pin 140 is coupled to the bellows actuator and a slotted sleeve 142 is coupled to closure element 135. A coil spring 144 is provided to maintain separation between closure element 135 and bellows 136. The lost motion linkage arrangement provides that substantial movement of the bellows is required in response to ambient temperature changes before the vent passageway is opened. This prevents slight movements and partial unseating of the closure element 135, and eliminates the possibility of slow valve opening.

In use, the valve mechanism of FIGS. 4–6 is installed in a circulating fluid system 150, such as a water cooling system, in the manner illustrated in FIG. 6. System conduits are connected to valve inlets 104 and 105 in the manner shown. A pneumatic system 152 is connected to fitting 128 and inlet passageway 127. If the temperature of the fluid in the circulating system 150 is above the actuating temperature of bellows 136, vent passageway 132 will be closed. Consequently, the pneumatic system will fill expansion chamber 120 with pressurized air, driving piston 122 downwardly together with stem 116, closing the valve. Assuming the temperature of the fluid passing through the valve is above the actuating temperature of the bellows, the valve will remain in this mode.

The method of operation to drain the fluid system in the embodiment of FIGS. 4–6 is essentially the same as in the first embodiment. As the temperature monitored by the bellows actuator drops below the actuating temperature, the bellows will contract, drawing down pin 140. When the pin reaches the bottom of slot 142, the closure element 135 of auxiliary valve 134 descends and opens vent passageway 132. The pressurized air in expansion chamber 120 immediately escapes the housing through vent passageway 132 and openings 131 and 133, and stem 116 is driven upwardly under the influence of spring 123, opening the valve. Assuming the valve is installed at the lowest point of the circulating fluid system 150, the entire system will drain through valve outlet 110.

In this embodiment the temperature of the fluid is monitored, rather than the ambient air temperature, as a result of the location of the bellows within stem 116. The temperature of the fluid is more important in circulating cooling systems, since the circulating fluid will generally be at a higher temperature than the surrounding air. Consequently, this embodiment drains the system only when the temperature of the fluid drops below the actuating temperature of the bellows.

Two additional alternative embodiments of the valve mechanism of the present invention are shown in FIGS. 7 and 8. In these embodiments, the pneumatic system for supplying pressurized medium to the expansion chamber of each above-described embodiment has been replaced by a pressurized gas reservoir, such as a $CO_2$ cartridge. The valve shown in FIG. 7 is identical to the valve shown in FIGS. 4 and 5, and in describing the embodiment of FIG. 7 the same reference numbers as in FIGS. 4 and 5 will be used for like parts. The valve shown in FIG. 8 is the same as in the first embodiment shown in FIGS. 1 and 2, and in describing the embodiment of FIG. 8 the same reference numbers as in the first embodiment will be used for like parts.

In the embodiment of FIG. 7, inlet passageway 127 will be provided with a different type of fitting 160, to which a $CO_2$ cartridge 162 or other similar compressed gas reservoir can be fitted. Similarly, inlet passageway 48 of the embodiment of FIG. 8 will be provided with a suitable fitting 170 which is compatible with a $CO_2$ cartridge 172 or similar compressed gas reservoir. When employing compressed gas reservoirs as the source of pressurized medium, it is probably unnecessary to use a check valve in the inlet passageway fitting, as in the previous embodiments. A suitable orifice of reduced diameter may be necessary, however.

Operation of the embodiment of FIGS. 7 and 8 is exactly the same as in the previous embodiments. The valves are installed in fluid systems where protection against freezing or other undesirable temperature exposure is needed. The use of a compressed gas reservoir eliminates the need for a pneumatic system, which would only be available on large machinery such as railway equipment. Consequently, the embodiments of FIGS. 7 and 8 are better adapted for home use or non-industrial applications. The embodiments of FIGS. 7 and 8 are particularly well adapted to hydraulic solar collectors and also evaporative systems where the use of antifreeze would be undesirable.

The present invention provides a temperature controlled valve mechanism which operates to drain a fluid system in response to temperature changes while providing full, safe and rapid opening of the valve mechanism upon occurrence of a predetermined temperature. The invention eliminates the problem of premature unseating and subsequent freezing of valves under rapidly falling temperature conditions by providing a large opening force under the influence of a spring. In addition, the valve is well adapted for use with railway equipment having built-in pneumatic systems, and which includes numerous water tanks and circulating systems which must be protected against freezing. The invention provides a method of draining the fluid system in response to temperature changes which is rapid and reliable and eliminates all possibility of premature unseating of the valve mechanism employed.

What is claimed is:

1. A temperature controlled valve mechanism comprising: a valve housing, a plurality of valve inlets in said housing for connection with a circulating fluid system having a fluid continuously circulating therethrough, a flow through conduit in said housing extending between said valve inlets, a valve outlet in said housing for draining fluid from said flow through conduit, a valve closure member supported for movement toward and away from said valve outlet between closed and open positions, said valve closure member blocking and closing said valve outlet when in said closed position, means forming an expansion chamber in said housing, said expansion chamber including a movable wall, said valve closure member being coupled to said movable wall and being movable to increase the volume of said expansion chamber when in said closed position and decrease the volume of said expansion chamber when in said open position, biasing means for urging said valve closure member away from said closed position, means for supplying a pressurized medium other than the fluid of said fluid system to said expansion chamber to exert a force counteracting said biasing means to move said valve closure member to said closed position, and temperature activated venting means for venting and depressurizing said expansion chamber upon occurrence of a predetermined circulating fluid temperature, the venting of said expansion chamber causing said biasing means to rapidly move said valve closure member from said closed position.

2. A temperature controlled valve mechanism as in claim 1 in which said valve closure member includes a stem extending into said flow through conduit, said stem having an open interior, said temperature activated venting means for venting and depressurizing said expansion chamber including a vent passageway through said movable wall between said expansion chamber and said open interior of said stem, auxiliary valve means in said open interior of said stem, said auxiliary valve means including a closure element which is movable to block and close said vent passageway, and a temperature responsive actuator in said open interior of said stem for imparting motion to said closure element upon occurrence of said predetermined circulating fluid temperature in the vicinity of said stem.

3. A temperature controlled valve mechanism as in claim 2 in which said temperature responsive actuator is coupled to said closure element by means of a lost motion linkage such that substantial movement of said temperature responsive actuator in response to circulating fluid temperature changes is required before said vent passageway is opened.

4. A temperature controlled valve mechanism as in claim 3 in which said temperature responsive actuator is disposed within the portion of said stem extending into said flow through conduit such that said temperature responsive actuator is responsive to changes in the temperature of fluid flowing through said flow through conduit.

5. A temperature controlled valve mechanism as in claim 1 including an inlet passageway communicating with said expansion chamber, means for connecting a source of pressurized medium to said inlet passageway, and a pneumatic system connected to said inlet passageway serving as the source of pressurized medium for filling said expansion chamber.

6. A temperature controlled valve mechanism as in claim 5 including a check valve in said inlet passageway, said check valve admitting pressurized medium into said expansion chamber by way of said inlet passageway and preventing escape of pressurized medium from said expansion chamber by way of said inlet passageway.

7. A temperature controlled valve mechanism as in claim 5 including an orifice of reduced diameter in said inlet passageway to reduce the flow of pressurized medium from said pneumatic system to said expansion chamber.

8. A temperature controlled valve mechanism as in claim 1 including an inlet passageway communicating with said expansion chamber and a compressed gas reservoir coupled to said inlet passageway and serving as the source of pressurized medium.

9. A temperature controlled valve mechanism transportable as a single unit comprising:
a single valve housing;
a plurality of valve inlets in the housing for connection with a circulating fluid system having a fluid continuously circulating therethrough;
a flowthrough conduit in the housing extending between the valve inlets;
a valve outlet in the housing for draining fluid from the flowthrough conduit;
a valve closure member supported in the housing for movement between closed and open positions, the valve closure member blocking and closing the valve outlet when in its closed position;
means in the housing forming an expansion chamber, the expansion chamber including a movable wall, the valve closure member being coupled to the movable wall and being movable to increase the volume of the expansion chamber when in the closed position and to decrease the volume of the expansion chamber when in the open position;
biasing means in the housing for urging the valve closure member away from the closed position;
means for supplying a pressurized medium other than the fluid of the fluid system to the expansion chamber to exert a force counteracting the biasing means to move the valve closure member to its closed position; and
temperature activated venting means in the housing for venting and depressurizing the expansion chamber upon occurrence of a temperature drop to a predetermined circulating fluid temperature, such venting of the expansion chamber causing the biasing means to rapidly move the valve closure member from its closed position.

10. A temperature controlled valve mechanism as in claim 9 in which the valve closure member includes a stem extending into the flowthrough conduit, the stem having an open interior, said temperature activated venting means for venting and depressurizing the expansion chamber including a vent passageway through the movable wall between the expansion chamber and the open interior of the stem, auxiliary valve means in the open interior of the stem including a closure element which is movable to block and close the vent passageway, and a temperature responsive actuator in the open interior of the stem for imparting motion to the closure element upon occurrence of a temperature drop to a predetermined circulating fluid temperature in the vicinity of the stem.

11. A temperature controlled valve mechanism as in claim 10 in which the temperature responsive actuator is coupled to the closure element by means of a lost motion linkage such that substantial movement of the temperature responsive actuator in response to circulating fluid temperature changes is required before the vent passageway is opened.

12. A temperature controlled valve mechanism as in claim 10 in which the temperature responsive actuator is disposed within the portion of the stem extending into the flowthrough conduit such that said temperature responsive actuator is responsive to changes in the temperature of fluid flowing through the flowthrough conduit.

13. A temperature controlled valve mechanism as in claim 9 including an inlet passageway communicating with the expansion chamber, means for connecting a source of pressurized medium to the inlet passageway, and a pneumatic system connected to the inlet passageway serving as the source of pressurized medium for filling the expansion chamber.

14. A temperature controlled valve mechanism as in claim 13 including a check valve in the inlet passageway, the check valve admitting pressurized medium into the expansion chamber by way of the inlet passageway and preventing escape of the pressurized medium from the expansion chamber by way of the inlet passageway.

15. A temperature controlled valve mechanism as in claim 13 including an orifice of reduced diameter in said inlet passageway to reduce the flow of pressurized medium from the pneumatic system to the expansion chamber.

16. A temperature controlled valve mechanism as in claim 9 including an inlet passageway communicating with the expansion chamber and a compressed gas reservoir coupled to the inlet passageway and serving as the source of pressurized medium.

17. A temperature controlled valve mechanism transportable as a single unit comprising:
a single valve housing;
a plurality of valve inlets in the housing for connection with a circulating fluid system having a fluid continuously circulating therethrough;
a flowthrough conduit in the housing extending between the valve inlets and through which fluid in an external fluid system connected to the valve inlets will flow;
a valve outlet in the housing for draining fluid from the flowthrough conduit;
a valve closure member supported in the housing for movement between closed and open positions, the valve closure member blocking and closing the valve outlet when in its closed position, the valve outlet draining the flowthrough conduit when the valve closure member is in its open position;
means in the housing forming an expansion chamber, the expansion chamber including a movable wall, the valve closure member being coupled to the movable wall and being movable to increase the volume of the expansion chamber when in the closed position and to decrease the volume of the expansion chamber when in the open position;
biasing means in the housing for urging the valve closure member away from the closed position;
means for supplying a pressurized medium other than the fluid of the fluid system to the expansion chamber to exert a force counteracting the biasing means to move the valve closure member to its closed position; and
temperature activated venting means in the housing for venting and depressurizing the expansion chamber upon occurrence of a temperature drop to a predetermined circulating fluid temperature, such venting of the expansion chamber causing the biasing means to rapidly move the valve closure member from its closed position, said temperature activated venting means including a temperature responsive actuator disposed in the flowthrough conduit to monitor the temperature of the fluid therein.

18. A temperature controlled valve mechanism as in claim 17 in which:
the valve outlet includes a seat; and
the valve closure member includes means for engaging the seat to close the valve outlet, and a valve stem extending into the flowthrough conduit, the temperature responsive actuator being disposed within the valve stem of the valve closure member to monitor the temperature of fluid in the flowthrough conduit.

* * * * *